United States Patent

Wold

[15] 3,648,040
[45] Mar. 7, 1972

[54] CHAIN-CODE CORRELATOR

[72] Inventor: Ivar Wold, Farnborough, Hampshire, England

[73] Assignee: The Solartron Electronic Group Limited, Farnborough, Hampshire, England

[22] Filed: May 26, 1970

[21] Appl. No.: 40,638

[30] Foreign Application Priority Data

May 28, 1969 Great Britain......................27,045/69

[52] U.S. Cl..........................235/181, 324/111, 324/158 SM
[51] Int. Cl. ......................................H03k 5/18, G01r 31/28
[58] Field of Search.....................235/181; 324/111, 158 SM

[56] References Cited

UNITED STATES PATENTS 3,046,545  6/1962  Westerfield........................235/181 X Primary Examiner—Eugene G. Botz
Assistant Examiner—R. Stephen Dildine, Jr.
Attorney—William R. Sherman, Stewart F. Moore, Jerry M. Presson and Roylance, Abrams, Kruger, Berdo and Kaul

[57] ABSTRACT

A chain-code correlator for determining the response of apparatus such as servomechanisms to command signals has a chain-code generator of $m$ stages and clock-frequency $f_o$ connected through a first sampler to an output circuit connected to apparatus to be tested. The sampler provides samples of the code at a recurrence frequency $f_o/2^m$. An input from the apparatus under test is connected through a synchronized second sampler to a multiplier where it is multiplied by the chain code. The output of the multiplier is applied to an averaging memory of $2^m-1$ stages giving the correlation function for $(2^m-1)$ time delays at increments of $1/f_o$. Only $m$ shift registers are required for $(2^m-1)$ time delays.

5 Claims, 3 Drawing Figures

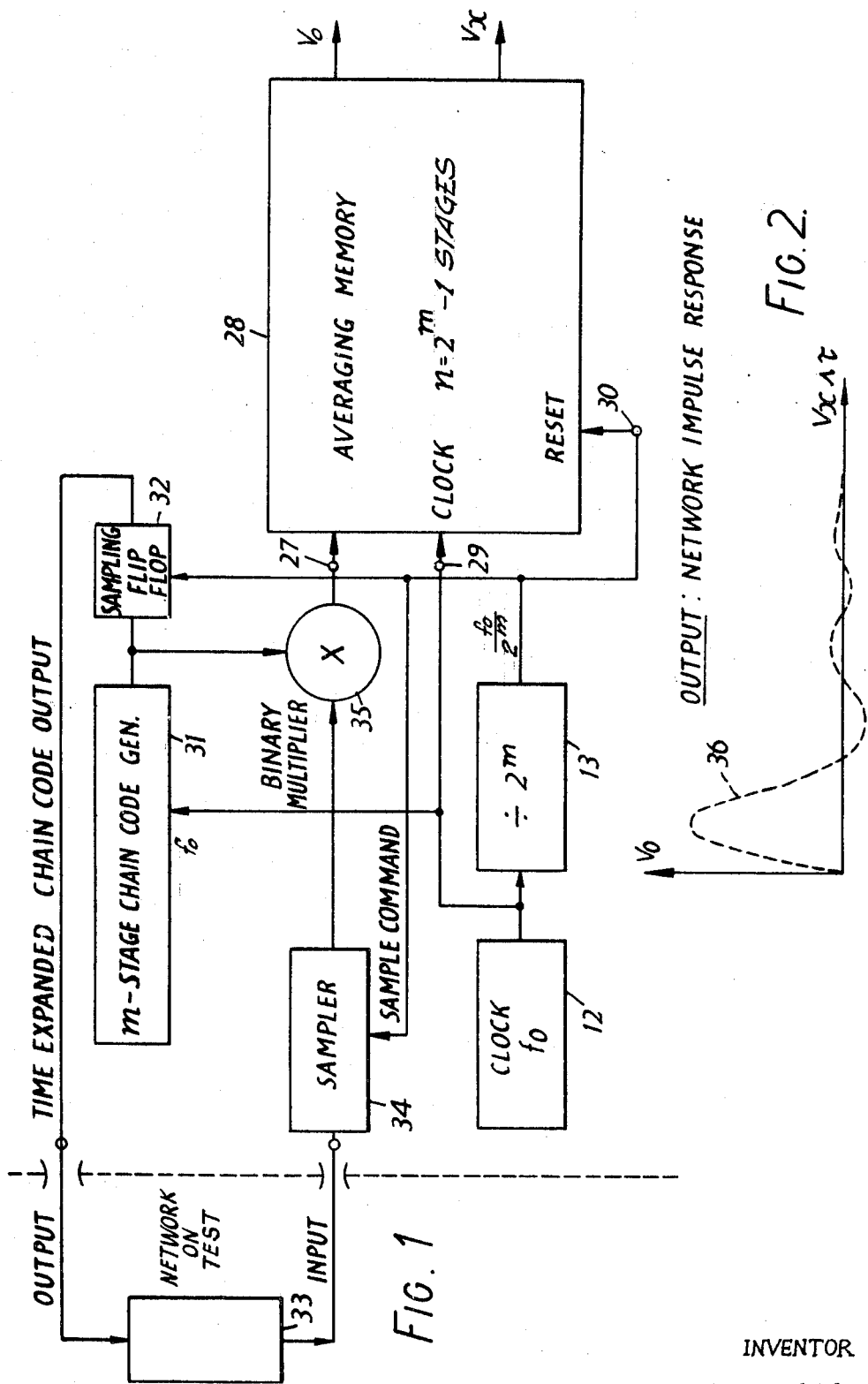

CHAIN-CODE CORRELATOR

The present invention relates to a chain-code correlator.

A knowledge of the response (or transfer function) of various types of apparatus, such as servomechanisms, is often required by engineers when designing such apparatus or when testing the ability of such apparatus to carry out prescribed functions.

There are several different ways in which the transfer function can be determined and one of these is to correlate the response to random inputs with the random inputs. For this purpose various techniques have been proposed such as those by Wiener in "Extrapolation Interpolation and Smoothing of Stationary Time Series" published by John Wiley & Sons 1957.

Random test signals are applied to the system under test and the response of the system is correlated with the test signals to derive the transfer function.

To effect this in one proposal the random test signal and the output of the apparatus under test are multiplied at different time delays and averaged. This technique, however, has demanded the use of a large number of shift registers and it is an object of the present invention to provide a correlator in which the number of shift registers required can be reduced substantially with consequent simplification of apparatus.

The invention makes use of a chain-code generator which is a known device, such as the Solartron Pseudo Random Signal Generator JM1861, for generating a pseudorandom sequence of signals. The code generated by feedback shift registers and repeats every $(2^m-1)f_o$ where $m$ is the number of stages in the generator and $f_o$ is the clock frequency. Such signals are suitable for providing sufficiently random test signals for application to apparatus in testing its response.

According to the present invention there is provided a chain-code correlator comprising a chain-code generator of $m$ stages and clock-frequency $f_o$ connected through a first sampler to an output circuit for connection to apparatus of which the impulse response is to be tested, the sampler being arranged to provide samples of the generated chain-code at a recurrence frequency of $f_o/2^m$, an input circuit for connection to the output of the apparatus to be tested connected through a second sampler to a multiplier, the second sampler being arranged to operate in synchronism with the first sampler, means for applying the output of the chain-code generator also to the multiplier, and means for applying the output of the multiplier to an averaging memory of $2^m-1$ stages and arranged to provide an output representative of the correlation function of the outputs of the first and second samplers for $(2^m-1)$ time delays at increments of $1/f_o$. Thus by means of the invention a correlator can be provided in which only $m$ shift registers are required for $(2^m-1)$ time delays. For example, only a 7-bit long register is required for 127 different time delays whereby a relatively simple correlator can be provided.

The invention will now be described, by way of example, with reference to the accompanying drawings, in which:

FIG. 1 is a block diagram of one embodiment of the invention,

FIG. 2 is an explanatory diagram for use in conjunction with FIG. 1, and

Figure 3:
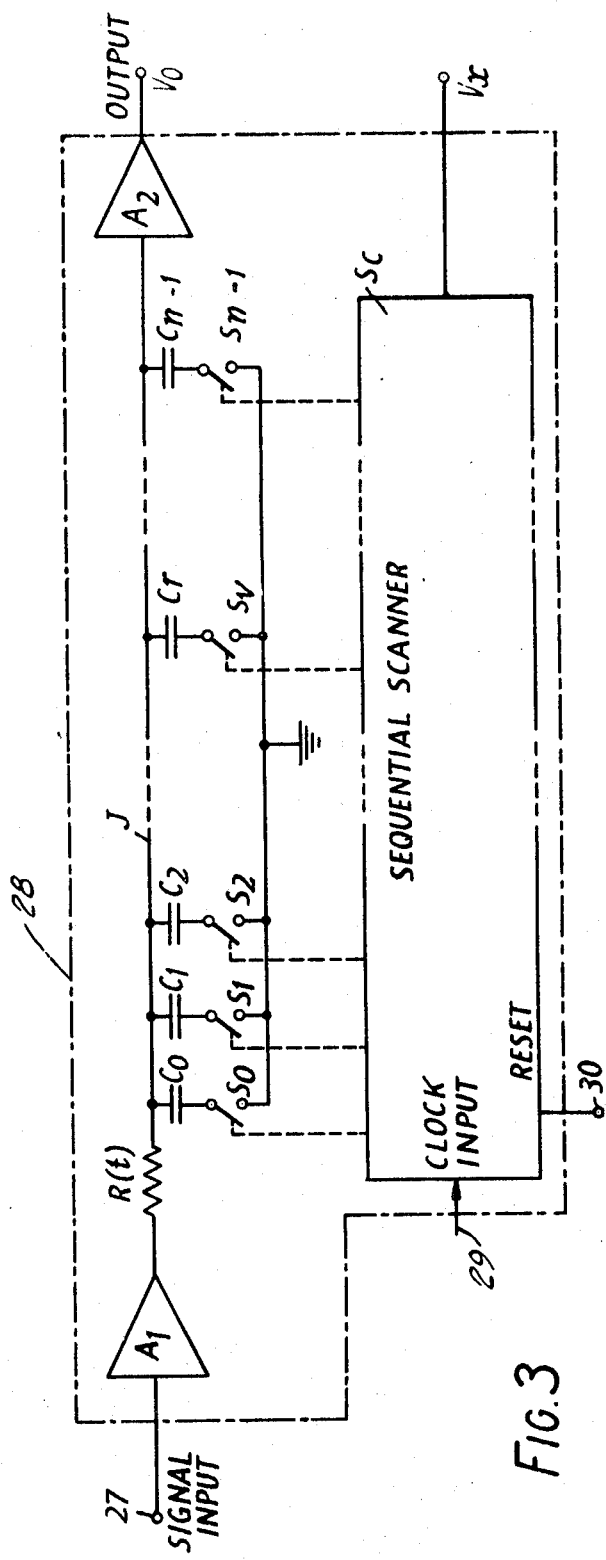
FIG. 3 is a block diagram of an averaging memory for use in the embodiment of FIG. 1.

Referring to FIG. 1, a chain-code correlator for use in determining the impulse response of apparatus such as servo apparatus comprises a chain-code generator 31 of $m$ stages. The output of the chain-code generator 31 is applied through a sampler 32 to apparatus 33 of which the impulse response is to be determined. The effect of the sampler is to time-expand the chain-code.

The output of the apparatus 33 under test is applied to a second sampler 34 arranged to operate in synchronism with the first sampler 32. The output of the second sampler 34 and the output of the chain-code generator 31 are multiplied in a multiplier 35.

A clock pulse generator 12 of frequency $f_o$ is provided for driving the chain-code generator and command pulses for operating the samplers 32 and 34 are derived from the generator 12 by a frequency-divider 13 with a division ratio of $2^m$.

The output of the multiplier 35 is applied to an averaging memory 28 of $2^m-1$ stages, operating clock-pulses being applied thereto from the clock-pulse generator 12 and resetting pulses being applied at terminal 30 from the divider 13.

At outputs $V_o$ and $V_x$ of the averaging memory 28 there appear signals suitable for displaying the impulse response of the apparatus 33 on a cathode-ray tube. FIG. 2 shows the general form of the response curve 36 displayed on the cathode-ray tube.

The chain-code generators, the samplers, the multiplier and the averaging memory are known devices but for completeness the averaging memory which is less well known will be described briefly.

A block diagram of the averaging memory is shown in FIG. 3 and may be as described in the Princeton Applied Research Corporation Technical Bulletin T162. The input terminal 27 is connected through an amplifier $A_1$ and a resistor $R(t)$ to a rail J. Between the rail J and earth is an array of capacitors $C_o, C_1 \ldots C_{(n-1)}$ each with a series connected switch $S_o, S_1 \ldots S_{(n-1)}$. The switches are controlled by a sequential scanner $S_c$ in such a way that they are closed for a short period in turn by clock pulses applied at 29, only one switch being closed at any one time. Each cycle or scan is made to repeat by a reset pulse applied at 30.

The rail J is connected to the input of an amplifier $A_2$ which is arranged to have a very high input impedance. Thus with any one of the switches closed, say switch $S_r$, the output from the amplifier $A_2$ is the voltage stored on the capacitor $C_r$ which approaches the value of the input signal at 27 in the interval when $S_r$ is closed.

It will be appreciated therefore that in each scanning cycle the voltages on the capacitors are modified to a new estimate of average which appears at the same time at the output terminal $V_o$ of the amplifier $A_2$.

The sequential scanner $S_c$ is arranged to provide an output at $V_x$ proportional to memory position, i.e. with switch $S_r$ closed the output voltage is $V_r$ where V is a constant voltage. Thus the output at $V_o$ can be displayed on a cathode-ray tube using $V_x$ for horizontal deflection and $V_o$ for vertical deflection.

In FIG. 1 the averaging memory of FIG. 3 is provided with $2_m-1$ stages and it will be appreciated that following the beginning of each scanning cycle the $r^{th}$ product is always put into the $r^{th}$ position in the averaging memory. The output from the multiplier 35 (FIG. 1) for each sample period will be the sample of the output $y$ of the apparatus 33 for the period multiplied by the successive outputs $x_1, x_2, x_3$, etc. of the chain-code generator during the period, of which there are $2^m$.

Thus the voltage on, say, $C_r$ in the averaging memory will approach the correlation between $x(t)$ and $y(t)$ at a delay of $\tau_r = r/f_o$ seconds. An oscilloscope connected to display $V_o$ against $V_x$ will show the correlation function (as shown for example in FIG. 2) for $2^m$ different time delays at increments of $1/f_o$.

In the known averaging memory shown in FIG. 3 the resistor $R(t)$ is fixed in value. We have found that true time-averaging can be obtained by arranging that $R(t)$ is increased before or after each scanning cycle such that the averaging RC time constant is approximately equal to the time which has elapsed since the start of the measurement. This can be arranged by means of a suitable network or array of resistors which are switched through appropriate switches controlled by a counter which is incremented after each scan.

What I claim is:

1. A chain-code correlator, comprising a chain-code generator of $m$ stages, a source of clock pulses of frequency $f_o$ connected to said chain-code generator, a first sampler connected between the output of said chain-code generator and an output terminal for connection to apparatus to be tested, means coupling said source to said first sampler to drive said first sampler at a recurrence frequency of $f_o/2^m$ and time-expand the code generated by said chain-code generator for application to said output terminal, an input terminal for connection to the output of the apparatus to be tested, a second sampler in synchronism with said first sampler at said input terminal, means for providing a signal to drive said second sampler in synchronism with said first sampler at said recurrence frequency $f_o/2^m$, a multiplier, means connecting the output of said chain-code generator to one input of said multiplier, means connecting the output of said second sampler to another input of said multiplier, an averaging memory of $2^m-1$ stages, means for providing a driving signal to said memory at said clock frequency $f_o$, means for providing a signal to reset said averaging memory at said frequency $f_o/2^m$, and means to apply the output of said multiplier to the input of said averaging memory.

2. A chain-code correlator according to claim 1, wherein said multiplier is a binary multiplier.

3. A chain-code correlator according to claim 1, wherein said means coupling said source to said first sampler comprises a frequency divider of division ratio $1/2^m$ connected between said source and said first sampler.

4. A chain-code correlator according to claim 3, wherein said means for providing a signal to drive said second sampler includes a conductor for providing thereto the output of said frequency divider.

5. A chain-code correlator according to claim 4, wherein said means for providing a signal to reset said averaging memory includes a conductor connected to supply the output of said frequency divider.

* * * * *